United States Patent Office 3,397,991
Patented Aug. 20, 1968

3,397,991
BLENDED PROTEIN ISOLATION PROCESS AND PRODUCT
Robert A. Johnson, 1501 San Ardo Drive, San Jose, Calif. 95125, and Patricia T. Anderson, 2631 Isabella Ave., San Mateo, Calif. 94403
No Drawing. Filed Apr. 3, 1964, Ser. No. 357,272
9 Claims. (Cl. 99—17)

ABSTRACT OF THE DISCLOSURE

Protein from more than one vegetable protein source is colloidally solubilized to provide a homogeneous blend of protein having a preselected assay of essential amino acids.

---

This invention relates to the isolation of protein from sources such as vegetable meals. More particularly, it relates to a process for homogeneously blending protein derived from two or more different sources and the product thereof.

The invention is based upon the discovery that the assay of essential amino acids of protein can be adjusted to any desired set of values by combining the protein from two or more different protein sources where each source has the appropriate amino acid content to achieve the desired balance in the end product. Further, it is based upon the discovery that the assay of the end combination product will be substantially uniform for any given sample of the product if the protein sources are simultaneously processed and intermixed during colloidal solubilization and recovery of their protein content. (Since the protein content does not ionize to form a true solution in the instant process but is present in the solvent as a colloid or dispersoid, the mechanism of causing the protein content to go into the solvent employed is referred to throughout this specification and claims as "colloidal solubilization.")

As is well understood, in order that man may survive he must be supplied with approximately 70 grams of protein a day which includes eight amino acids that he cannot physiologically synthesize in his body. These eight amino acids are commonly referred to as indispensable amino acids and are tryptophan, lysine, leucine, isoleucine, methionine, phenylalanine, threonine and valine. According to Block and Weiss in their "Amino Acid Handbook" the daily requirements for these essential amino acids of an average adult man in grams per day are:

| | |
|---|---|
| Tryptophan | 0.25 |
| Lysine | 0.80 |
| Leucine | 1.10 |
| Isoleucine | 0.70 |
| Methionine | [1] 0.22 |
| Phenylalanine | 1.10 |
| Threonine | 0.50 |
| Valine | 0.80 |

[1] Estimated for maintenance from work of W. C. Rose.

In addition to the fact that all eight of these are essential and cannot be synthesized by the body, if any one of these eight amino acids is not present at the time that the other seven are introduced into the body, man cannot utilize the other seven. Withholding of an indispensable amino acid even for a few hours has been observed to produce growth retardation or a negative nitrogen balance.

All proteins are not equally nutritious and do not all contain equal amounts of the essential amino acids. Animal proteins are generally superior to vegetable proteins. Thus, a major cause of the poor nutritional value of the vegetable proteins is a low content or unavailability of one or more of the indispensible amino acids. For example, vegetable proteins of the type here of most interest tend to be lacking in methionine and lysine.

At the same time, vegetable proteins in most instances are relatively abundantly available and are relatively inexpensive as compared with animal proteins. The present invention is designed to permit a blend of several vegetable proteins to balance the lack of a particular essential amino acid or acids in the vegetable proteins involved and thereby produce and end product that is desirably high in all of the essential amino acids or in certain ones of these acids of special interest.

In order to accomplish the foregoing, the present invention permits a shift in the first limiting amino acid in the protein. The first limiting amino acid is that amino acid available in the least amount with reference to the requirements of the protein pattern being followed. In addition to making possible a change in the first limiting amino acid, the present invention can likewise be employed to shift the relative amount of the second or third or any other amino acid of the protein. These latter shifts may be desirable when attempting to obtain a particular balance of the amino acids. In addition, by the preferred method of this invention wherein mixed sources of vegetable proteins are combined, alternate patterns of amino acid complements for dietary purposes may be sought to simulate the amino acid content of other proteins such as found in egg albumin, the casein of milk, meat or other specially prescribed rations for the dietary needs of infant feeding, geriatrics, pregnancy, and the like.

The present invention overcomes the difficulties encountered where a simple dry blending of preliminarily isolated proteins is attempted. A dry mixing of previously isolated proteins does not usually achieve a homogeneous blending of the materials because of the physical properties of dried protein. The low bulk density and electrostatic charges on the protein which may be imparted by the drying process prevents the achievement of the necessary uniformity in the mass of the combined materials. For example, where two proteins are dry blended after having been separately isolated and prepared, the amino acid assay of a given sample of the mixture may vary by about 5% to 10% from other randomly selected samples of the mass. Use of such a material is therefore not feasible where a careful control over nutrition is desired. On the other hand, the product of the present invention is characterized by uniformity of the amino acid assay throughout its mass.

Accordingly, the present invention provides a process for preparing a substantially homogeneous blend of protein having a preselected assay of essential amino acids comprising colloidally solubilizing protein contained in at least two different sources thereof and combining the solubilized protein in the same aqueous solution. Each of the sources of protein is selected for its amino acid content and is combined in an amount so as to provide the desired assay of amino acids after solubilization. The aqueous solution of the solubilized protein is separated from the residue of the protein sources and the aqueous solvent is removed from the protein to yield the desired end product of uniform amino acid assay.

In the preferred embodiment of this invention, the sources of the protein are vegetable meals since they represent a readily available inexpensive source. It should be understood that any other protein source could be used in combination with these vegetable sources or by themselves and the principles of the invention remain unchanged.

Attendant the use of vegetable sources, and aside from the fact that these may already be low in some of the essential amino acids, other phenomena are encountered which result in end products deficient in the desired amino acid content. Thus, in the extraction and isolation of proteins by chemical means from vegetable sources, it is not generally possible to completely predict the amino acid pattern in the final product with any precision based upon what may have been its starting amino acid pattern. This is because there are several classes of proteins in these various meal sources. In the simple proteins there are albumins, globulins, glutelins, protamines, albuminoids, prolamines and histones. In most economically feasible processes, only one or two of these main groups of proteins may be isolated or extracted thereby frequently altering the amino acid pattern in the isolate as compared with that in the protein prior to extraction.

This loss in extraction is of no great concern in the present invention since the loss of protein upon extraction from one vegetable source can be complemented by the protein obtained from another source that has been selected with the deficiency of the first source in mind. Because of the inability to precisely predict what will be obtained from any given source of protein by the usual extraction processes, a certain amount of trial and error may be required before the precise end product desired is obtained by the present process.

In practicing the preferred embodiment of the present invention, vegetable sources of protein are utilized. These sources are generally termed vegetable meals and may be derived from the seeds of vegetables such as cotton, sesame, soy, rape, wheat bran, safflower, chick pea, linseed, peanut and coconut. The term "vegetable meal" refers generally to the by-product produced when such seeds are treated to remove the vegetable oil carried by the seeds. The remaining by-product of this operation is known as a vegetable meal or press cake and is referred to by such terms throughout this specification and the claims.

Isolation of protein from the vegetable meal is executed for other reasons in addition to the present one. Thus, the protein when consumed must be available and digestable by the human system. For this reason, it is important to isolate the protein from the extraneous, non-useable fibrous materials associated with the vegetable meals. In the isolated form the protein is also more easily utilizable in the preparation of food formulas.

The isolation or extraction process of the present invention generally follows that which is presently practiced by the art for colloidally solubilizing protein and removing it from vegetable meal. This prior art process generally consists of forming an aqueous slurry with the vegetable meal or press cake and water. The slurry may be prepared so as to contain preferably about 10% to 20% solids and in any event is made sufficiently liquid so as to render the slurry flowable for liquid transport. Sufficient liquid is preferably utilized so that contact is made by the liquid with all surfaces of the meal during agitation and treatment. Colloidal solubilization of the protein in the meal is accomplished in this aqueous slurry.

While any suitable process could be used, the preferred embodiment of the present invention contemplates a partial alkaline hydrolysis wherein the alkalinity is imparted by a suitable alkali such as potassium or sodium hydroxide. Preferably sufficient alkali is added to adjust the pH of the slurry to about 10.5 although a pH range of about 9–12 may be used. This partial hydrolysis and colloidal solubilization of the protein is enhanced by heating the slurry preferably between about 150° and 200° F. for a time necessary to achieve the requisite degree of hydrolysis. It will be understood by those skilled in the art that the hydrolysis step here referred to as partial hydrolysis is a relatively mild treatment just sufficient to cause the protein to go into the solvent as protein molecules and free it from the balance of the protein source. It should be distinguished from extreme hydrolysis which may denature the protein or liberate free amino acids.

After the protein has been solubilized, the aqueous solution containing the protein may be physically separated from the residue of the protein source such as by filtration or centrifuging. The protein can then be recovered from solution by precipitation by adjusting the cation or hydrogen ion concentration of the solution to the appropriate point. Generally, this is accomplished by acidifying the solution upon the addition of a suitable acid such as hydrochloric acid.

The precipitated protein is suitably separated from the aqueous layer by a convenient process which may take the form of filtration or centrifuging. The protein can then be dried in the isoelectric state if desired by any convenient technique.

In the preferred embodiment drying is conducted by spraying after the isoelectric protein has been colloidally resolubilized. This is accomplished by adding a base such as sodium hydroxide to neutralize the product and form a proteinate with the cation of the base. Drying occurs when the resolubilized product is sprayed into a stream of warm air in a spray dried with the influent air having a temperature of up to about 400° F. The product is thereby heated to about 130° F. It will be understood that these conditions of drying are merely exemplary and considerable variation could take place without adversely affecting the quality of the end product. Of course, other drying techniques could be used altogether.

In the present invention instead of utilizing a single source of protein during alkaline hydrolysis, two or more protein sources are hydrolyzed and the solubilized protein combined. The combination of the solubilized protein may be accomplished by combining the aqueous solutions following the hydrolysis. Preferably the alkaline hydrolysis may be executed upon previously combined protein sources so that when the proteins are solubilized they will automatically be combined in a common solution.

As before, the yield of the protein isolate can be improved by the combination of other techniques with the alkaline hydrolysis step. Thus, the yield may be greatly improved by the use of proteolytic enzymes in the manner previously taught. See patent application, Ser. No. 74,472, filed Dec. 8, 1960 now U.S. Patent 3,127,388. As also described in that application, the yield of isolate and the condition of the curd can be improved by the use of hydrogen peroxide during the isolation of the protein. All of these techniques are suitably employed with the present invention as desired.

No definite figures or instructions can be given for the amounts of the various protein sources that are to be used. This will be governed by the type of end product desired, the amino acid content requirement, and the utility contemplated for the end product. The protein sources and their amounts should be selected for purposes of the present invention so as to provide the desired end product. In many cases, before experience is built up, this may require some trial and error techniques since it is not possible to completely predict the isolate composition that will be obtained from a particular protein source.

The following examples will illustrate the type of shift of the limiting amino acids that can be accomplished by blending during the isolation process of protein from two sources. The following procedure was followed in obtaining product A:

37.5 pounds of solvent extracted soy meal (protein content, 44.6%) and 37.5 pounds of solvent extracted sesame meal (protein content, 46.8%) were slurried with 81 gallons of water with good agitation. The resultant slurry had a volume of 95 gallons. 4,750 milliliters of a sodium hydroxide solution (approximately 16%) were added to the slurry to give an initial pH of 10.5. The slurry was heated to 166° F. and held for 30 minutes with good agitation. The pH had lowered to 9.7. 1,300 milliliters of the same sodium hydroxide solution were added to the slurry thus raising the pH to 10.3 and insuring complete reaction of the hydrogen peroxide. 2,000 milliliters of 35% hydrogen peroxide were added to the slurry. The slurry temperature was raised to 193° F. by steam injection (approximately 3 minutes come-up time) and held at the temperature for 25 minutes until the hydrogen peroxide reaction was complete.

The slurry was then cooled to 156° F. It was then passed through a pulper to remove the coarse solids and then passed through a de-sludging centrifuge to remove the rest of the solids from the liquid solution. The coarse and fine solids from the pulper and centrifuge were composited. A volume of water approximately equal to the volume of the liquid solution was added to the composited solids, the resultant slurry heated to 140° F. and again run through the pulper and centrifuge to separate the solids from the liquid solution. This recycle is a washing procedure.

The two liquid portions were combined and the temperature adjusted to 80° F. The protein was precipitated from the solution by adding a hydrochloric acid solution (approximately 10% HCl) rapidly with good agitation until a pH of 4.0 was reached. The precipitated protein was allowed to settle and 65 gallons of the "whey" were decanted from the mixture. 86 gallons of acidulated water (adjusted to pH 4.5 with the HCl solution) were added to the precipitated curd, the mixture well mixed and the curd allowed to settle. 75 gallons of liquid were then removed from the mixture by decantation. 77 gallons of acidulated water were added to the precipitated curd, again remixed and the curd allowed to settle. 89 gallons of liquid were then removed from the mixture by decantation. 90 gallons of acidulated water were added to the precipitated curd, well mixed and the curd again allowed to settle. 98 gallons of liquid were removed by decantation.

The precipitated protein was then passed over a vacuum drum filter to remove excess "free" water and the curd was washed again on the drum with fresh water. The curd was then made into a dispersoid by raising the pH to 7 by the addition of a sodium hydroxide solution (10% sodium hydroxide), the product heated to 130° F. and spray dried with influent air at about 400°–450° F. (The effluent air temperature in the spray dryer was approximately 180°–190° F.)

All fractions separated during the process were analyzed for total solids (or moisture) and protein. The spray dried protein isolate was analyzed for the eight indispensable amino acids (tryptophan, lysine, leucine, isoleucine, methionine, phenylalanine, threonine and valine).

The spray dried protein isolate had a protein content of 85.5%. It represented 34.2% of the solids in the original material and 52.8% of the protein in the original material. Amino acid assay results of this material, labelled Product A, are to be found in Table I.

The dried sludge solids from the alkaline extraction step had a protein content of 27.0%. It represented 34.7% of the solids in the original material and 25.1% of the protein in the original material.

Approximately 31.1% of the solids and 22.1% of the protein in the original material were present in the acidified "whey" and washes in the form of soluble material.

Products B, C and D shown in the tables below were prepared in substantially the same manner as Product A except that in the case of Products C and D the pH was adjusted to 10.5 before being put in the pulper. Product B was made from 75 pounds of solvent extracted soy meal (protein content 44.6%) by itself without combination with another source of protein. Product C was made from 75 pounds of solvent extracted sesame meal (46.8% protein) by itself without combination with another source of protein, and Product D was made from 41.25 pounds of solvent extracted soy meal (protein content 43.8%) in combination with 33.75 pounds of solvent extracted sesame meal (protein content 46.8%).

The analyses of the amino acid content of the four products are shown in Table I.

TABLE I

| Amino Acid | Product A, mg./g. as is | Product B, mg./g. as is | Product C, mg./g. as is | Product D, mg./g. as is |
| --- | --- | --- | --- | --- |
| Tryptophan | 10.1 | 10.4 | 13.1 | 12.0 |
| Phenylalanine | 49.5 | 43.2 | 39.7 | 41.9 |
| Isoleucine | 42.8 | 36.1 | 41.0 | 43.7 |
| Lysine | 30.4 | 45.6 | 20.0 | 31.3 |
| Valine | 58.2 | 42.1 | 88.4 | 49.8 |
| Threonine | 41.2 | 30.4 | 27.8 | 28.3 |
| Methionine | 15.4 | 8.8 | 26.0 | 11.0 |
| Leucine | 64.8 | 60.1 | 54.0 | 59.5 |

Table II includes the data of Table I where the analyses have been corrected to 100% protein to eliminate variations due to varying protein purity in the end product.

TABLE II—AMINO ACID ASSAYS CONVERTED TO 100% PROTEIN (N x 6.25)

| Amino Acid | Product A, mg./g. | Product B, mg./g. | Product C, mg./g. | Product D, mg./g. |
| --- | --- | --- | --- | --- |
| Typtophan | 11.8 | 12.8 | 13.8 | 14.2 |
| Phenylalanine | 57.9 | 53.3 | 41.8 | 49.7 |
| Isoleucine | 50.2 | 44.6 | 43.2 | 51.7 |
| Lysine | 35.6 | 56.3 | 21.1 | 37.1 |
| Valine | 68.1 | 52.0 | 93.0 | 59.1 |
| Threonine | 48.2 | 37.6 | 29.3 | 33.5 |
| Methionine | 18.0 | 10.9 | 27.4 | 13.0 |
| Leucine | 75.8 | 74.3 | 56.8 | 70.5 |

Table III shows, in grams per day, the quantity of the four products which will supply man's daily amino acid requirements for each of the eight essential amino acids. This table is also based on 100% protein (N x 6.25).

TABLE III

| Amino Acid | Grams per day required | Grams of Protein To Satisfy Daily Requirements for Adult Maintenance | | | |
| --- | --- | --- | --- | --- | --- |
| | | Product A | Product B | Product C | Product D |
| Tryptophan | 0.25 | 21.2 | 19.5 | 18.1 | 17.6 |
| Phenylalanine | 1.10 | 19.0 | *(20.6) | 26.3 | (22.2) |
| Isoleucine | 0.70 | 13.9 | 15.7 | 16.2 | 13.5 |
| Lysine | 0.80 | (22.4) | 14.2 | (37.9) | 21.6 |
| Valine | 0.80 | 11.7 | 15.4 | 8.6 | 13.5 |
| Threonine | 0.50 | 10.4 | 13.3 | 17.1 | 14.9 |
| Methionine | 0.22 | 12.2 | 20.2 | 8.0 | 16.9 |
| Leucine | 1.10 | 14.5 | 14.8 | 19.4 | 15.6 |

* ( ) 1st limiting amino acid

With reference to Table III it can be seen that the first limiting amino acid in the 100% sesame isolate of Product C has been successfully shifted from lysine to phenylalanine in the combination of protein Product D. This means that the daily intake of the protein to acquire the necessary lysine has been reduced from 37.9 grams to 21.6 grams or a decrease of 43%. (Based upon the correction to 100% protein noted above.)

The first limiting amino acid in the 100% soy isolate of Product B has been successfully shifted from phenylalanine to lysine in Product A. Therefore, the daily intake of protein to acquire the necessary phenylalanine requirement has been reduced from 20.6 grams in Product B to 19.0 grams in Product A, or a decrease of 8%.

Of equal or even greater significance in comparing Products A and B, is the quantity of protein required for daily methionine needs which is so important to growth. This has been reduced from 20.2 grams in product B to 12.2 grams in product A. This amounts to a decrease of 40% in the amount of protein necessary to acquire man's daily maintenance needs of methionine.

The above example illustrate how, by combining the protein isolate from two or more sources, it is possible to reduce dramatically the amount of one of the two products required for satisfying the daily need of all of the essential amino acids. The work also illustrates how other parts of the protein relating to the second or third or other limiting amino acid can be shifted to prepare a "customized" product. Thus, Product A may be of greater value relative to Product B where growth is the predominant factor involved in the feeding program contemplated for the product. It should be obvious that any other desired shifts in the balance of the amino acids could be achieved by suitably combining the appropriate protein sources in suitable amounts.

In all cases of the products prepared by the present invention, and particularly Products A and D illustrated above, the assay of the amino acid content is substantially uniform throughout the mass. This is in sharp distinction with the lack of uniformity of assay of such a product which might be prepared by physically blending dried isolates which have been separately prepared prior to combination.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A process for preparing a substantially homogeneous blend of protein having a preselected assay of essential amino acids comprising: colloidally solubilizing vegetable protein contained in at least two different sources thereof, combining said protein in the same aqueous solution either before or after said solubilization, each of said sources of protein being selected for its amino acid content and being combined in an amount to provide said preselected assay after solubilization, separating the aqueous solution of solubilized protein from the residue of the protein sources, and removing the aqueous solvent from the protein.

2. A process in accordance with claim 1 wherein said vegetable meals are selected from the group consisting of vegetable meals derived from the seeds of cotton, sesame, soy, rape, wheat bran, chick pea, linseed, peanut, safflower, and coconut.

3. A process for preparing a substantially homogeneous blend of protein having a preselected assay of essential amino acids comprising: colloidally solubilizing protein contained in at least two different vegetable meal sources by partial alkaline hydrolysis of said sources in the same aqueous solution, each of said vegetable meals being selected for its amino acid content and being added in an amount to provide said preselected assay after solubilization, separating the aqueous solution of solubilized protein from the residue of said vegetable meals, and removing the aqueous solvent from the protein.

4. A process for preparing a substantially homogeneous blend of protein having a preselected assay of essential amino acids comprising: colloidally solubilizing protein contained in at least two different vegetable meal sources by heating said vegetable meals in a common aqueous solvent at about 150°–200° F. and at a pH of about 9 to 12, each of said vegetable meal sources of protein being selected for its amino acid content and being added in an amount to provide said preselected assay after solubilization, separating the aqueous solution of solubilized protein from the residue of the vegetable meal protein sources, and drying the separated aqueous solution to obtain the desired protein blend.

5. A process in accordance with claim 4 wherein the solubilization of said protein is executed in the presence of hydrogen peroxide to increase the yield and improve the consistency of the protein.

6. A process in accordance with claim 4 wherein said heating is conducted at a pH of about 10.5.

7. A process for preparing a substantially homogeneous blend of protein having a preselected assay of essential amino acids comprising: colloidally solubilizing protein contained in at least two different vegetable meal sources by partial alkaline hydrolysis at a pH of about 9–12, combining said protein in the same aqueous solution either before or after said hydrolysis, each of said sources of protein being selected for its amino acid content and being used in an amount to provide said preselected assay after solubilization, separating the aqueous solution of solubilized protein from the residue of the vegetable meal sources of the protein after said combining step, precipitating the protein from said aqueous solution by acidifying the solution, removing the precipitated protein from the aqueous solvent, resolubilizing said protein in an aqueous alkaline solution, and then drying said resolubilized protein solution by spraying it into a stream of warm air.

8. A dried protein isolate produced according to the process of claim 1 having a preselected assay of essential amino acids, the protein being derived from at least two different sources thereof, and the amino acid assay being substantially uniform for any given sample of the isolate.

9. A dried protein isolate in accordance with claim 8 wherein said vegetable meals are selected from the group consisting of vegetable meals derived from the seeds of cotton, sesame, soy, rape, wheat bran, safflower, chick pea, linseed, peanut, and coconut.

References Cited

UNITED STATES PATENTS

| | | | |
|---|---|---|---|
| 2,344,229 | 3/1944 | Block et al. | 99—14 |
| 3,018,280 | 1/1962 | Salzberg et al. | 260—123.5 |
| 3,080,234 | 3/1963 | Jarowski | 99—14 |
| 3,127,388 | 3/1964 | Johnson et al. | 99—14 |
| 3,212,902 | 10/1965 | Bavisotto | 99—14 |

OTHER REFERENCES

Altschul, Processed Plant Protein Foodstuffs, Academic Press, Inc., New York, 1958, pp. 45, 254–261, 401, 486–489 and 526.

A. LOUIS MONACELL, *Primary Examiner.*

H. H. KLARE III, *Assistant Examiner.*